United States Patent
Ishida

(10) Patent No.: US 6,434,171 B1
(45) Date of Patent: Aug. 13, 2002

(54) DIGITAL MULTIPLEX TRANSMISSION APPARATUS

(75) Inventor: Tadahiro Ishida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/167,150

(22) Filed: Oct. 6, 1998

(30) Foreign Application Priority Data

Mar. 13, 1998 (JP) .......................................... 10-062429

(51) Int. Cl.$^7$ ................................................. H04J 1/02
(52) U.S. Cl. ...................... 370/537; 370/235; 370/252; 370/485
(58) Field of Search ................................. 370/230, 232, 370/233, 234, 235, 252, 465, 468, 485, 486, 487, 537, 538, 540

(56) References Cited

U.S. PATENT DOCUMENTS 5,901,149 A * 5/1999 Itakura et al. ............... 370/468
6,208,640 B1 * 3/2001 Spell et al. .................. 370/468

FOREIGN PATENT DOCUMENTS

JP         3-191618      8/1991    ............ H03M/7/30

* cited by examiner

*Primary Examiner*—Douglas Olms
*Assistant Examiner*—Shick Hom
(74) *Attorney, Agent, or Firm*—Katten Muchin Zavis Rosenman

(57) ABSTRACT

Transport stream multiplexers detect the transmission rates of audio and video information of each of a plurality of programs multiplexed and transmitted. If a situation arises in which the total value of the transmission rates exceeds the maximum transmission rate allowed for the transmission path, the mulitplexer transmits (branches) partial service information to a subscriber device via a digital set-top box (DSTB) control unit by using a different high-frequency signal. As a result, the total value of the transmission rates of the multiplexed information is reduced by an amount equivalent to the service information that was branched, whereby the total value falls below the maximum transmission rate allowed for the transmission path. This makes it possible to reproduce normal audio and video at the subscriber device.

7 Claims, 10 Drawing Sheets

FIG.9 PRIOR ART

| NAME OF SERVICE INFORMATION | PID | table id | REMARKS |
|---|---|---|---|
| PAT | 0x0000 | 0x00 | ⎫ |
| CAT | 0x0001 | 0x001 | ⎬ PSI |
| PMT | SPECIFIED WITHIN PAT | 0x002 | ⎭ |
| NIT | 0x0010 | 0x40, 0x41 | ⎫ |
| SDT | 0x0011 | 0x42, 0x46 | ⎪ |
| BAT | 0x0011 | 0x4A | ⎪ |
| EIT | 0x0012 | 0x4E, 0x4F 0x50, 0x5F 0x60, 0x6F | ⎬ SI |
| TDT | 0x0014 | 0x70 | ⎪ |
| RST | 0x0013 | 0x71 | ⎪ |
| ST | 0x0010, 0x0011 0x0012, 0x0013 | 0x72 | ⎭ |

DIGITAL MULTIPLEX TRANSMISSION APPARATUS

BACKGROUND OF THE INVENTION

This invention relates to a digital multiplex transmission apparatus and system. More particularly, the invention relates to a digital multiplex transmission apparatus and system for multiplexing audio/video information of a plurality of programs and service information, modulating a carrier signal by the multiplexed information and transmitting the signal obtained by modulation to a subscriber device via an optical transmission line.

In CATV broadcasting or CS satellite digital broadcasting, etc., audio/video information of a plurality of programs in which the MPEG-2 TS (transport stream) format is used as the logic format and service information (SI) is multiplexed and transmitted, via a network, to a digital broadcast receiving terminal (referred to as a "digital set-top box" or "DSTB") installed in one's home. A subscriber uses the DSTB to receive the multiplexed signal and enjoy a desired program. Examples of programs include digital television broadcast programs, digital audio broadcast programs and on-demand service programs. Various tables make up the service information SI necessary for selecting a desired program from a plurality of programs multiplexed by the MPEG-2 format, decoding the program and reproducing it.

FIG. 9 is a correspondence table illustrating the correspondence among the names of various tables constituting the service information SI, packet identifiers PID and table IDs. The tables are as follows:

(1) PAT (Program Association Table);
(2) CAT (Conditional Access Table);
(3) PMT (Program Map Table);
(4) NIT (Network Information Table);
(5) SDT (Service Description Table);
(6) BAT (Bouquet Association Table);
(7) EIT (Event Information Table);
(8) TDT (Time Date Table);
(9) RST (Running Status Table); and
(10) ST (Stuffing Table).

The first four tables PAT, CAT, PMT and NIT are stipulated by ordinance and are referred to as PSI (Program Specific Information). An overview of the functions of these tables is as follows: (1) The PAT, which is transmitted with a PID of 0, specifies the packet identifier (PID) of a TS packet (transport stream packet) for transmitting the table PMT, which describes the program structure of each broadcasting program. (2) The CAT specifies the packet identifier of a TS packet for transmitting information related to subscription broadcasts (namely decryption and decoding permission information, etc., necessary for decoding a scrambled program). (3) The PMT specifies the packet identifier of a TS packet for transmitting various encoded signals (video and audio signals, etc.) constituting a broadcast program. (4) The NIT transmits information that associates information regarding the transmission path, such as the modulation frequency, and the broadcast program. (5) The SDT specifies information relating to programming channels, such as the name of the programming channel and the name of the broadcast provider. (6) The BAT specifies information relating to a bouquet, such as the name of the bouquet (a group of programming channels) and the programming channels included. (7) The EIT specifies information relating to a program, such as the name of the program, the broadcast date and time and a description of the program content. (8) The TDT specifies the present date and time. (9) The RST specifies the present running status of a program. (10) The ST is a table indicating the invalidation of a table.

FIG. 10 is a diagram useful in describing the hierarchical data structure of MPEG-2 TS PSI. The PAT (Program Association Table) indicates the PID of a TS packet for transmitting, for each program number, the table PMT (Program Map Table) that describes the program composition. Transmission is by a packet whose packet identifier PID is 0. In FIG. 10, the identifier PID of the packet that transmits the PMT of program i is Mi, and the identifier PID of the packet that transmits the PMT of program j is Mj. The PMT indicates the identifier PID of a packet for transmitting a video stream or audio stream constituting the program. This indicates that the identifier PID of a packet for transmitting the video stream of program i is Vi and that the identifier PID of a packet for transmitting the audio stream of program i is Ai. Further, it indicates that the identifier PID of a packet for transmitting the video stream of program j is Vj and that the identifier PID of a packet for transmitting the audio stream of program j is Aj.

Thus, with a digital multiplex transmission system using the MPEG-2 TS format in CATV broadcasting or CS satellite digital broadcasting, audio/video information of a plurality of programs and service information SI is transmitted upon being multiplexed. Consequently, when the number of programs multiplexed increases or the transmission bit rate of a program (audio bit stream/video bit stream) increases, a situation can arise in which the total value of the bit rates of multiplexed information exceeds the maximum transmission rate allowed for the transmission path. The conventional practice in such case is to perform multiplexing while discarding some of the entered MPEG-2 transport streams. However, when MPEG-2 transport streams thus multiplexed with a portion thereof discarded are received and decoded by the DSTB, normal audio/video cannot be obtained.

SUMMARY OF THE INVENTION

Accordingly, an object of the present invention is to make it possible to generate normal audio/video in a subscriber device (DSTB) even when the total value of multiplexed information transmission rates exceeds the maximum transmission rate allowed for a transmission path.

According to the present invention, the foregoing object is attained by providing a digital multiplex transmission apparatus comprising (1) a transmission rate detector for detecting transmission rates of video information and audio information of a program; (2) a total transmission rate calculation unit for calculating total value of transmission rates of multiplexed video information and audio information of each program; (3) a comparator for comparing a prescribed transmission rate, which is decided by a maximum transmission rate allowed for a transmission path, with the total transmission rate; and (4) a service information transmission unit which, when the total transmission rate is greater than the prescribed transmission rate, is for transmitting the service information to a subscriber device (DSTB) via the transmission path using a second high-frequency signal that is different from a first high-frequency signal that transmits the video and audio information. The subscriber device has service information decoding means for decoding the service information sent using the second high-frequency signal.

In accordance with this arrangement, some or all of the service information is transmitted to the subscriber device via the transmission path using the second high-frequency signal if the total value of the transmission rates of multiplexed information obtained by multiplexing audio/video information of each program and service information SI exceeds the maximum transmission rate allowed for the transmission path. (Such transmission is referred to as "branched transmission".) As a result, the total value of the transmission rates of the multiplexed information is reduced by an amount equivalent to the service information sent by branched transmission, whereby the total value falls below the maximum transmission rate allowed for the transmission path. This makes it possible to obtain normal audio and video at the subscriber device (DSTB).

The digital multiplex transmission apparatus further includes a subscriber control unit (DSTB control unit) for sending and receiving control information (billing information, participation information, etc.) to and from the subscriber device (DSTB) using the second high-frequency signal different from the first high-frequency signal that transmits the multiplexed information obtained by multiplexing the video and audio information of each program. The subscriber control unit, therefore, is used as the service information transmission unit. If this arrangement is adopted, the digital multiplex transmission apparatus and DSTB need not be provided with new hardware for sending and receiving the second high-frequency signals.

Since the event information table EIT has the highest transmission rate of the tables in the service information, only this table is transmitted to the subscriber device using the second high-frequency signal. If this expedient is adopted, it will be unnecessary to transmit all of the service information using the second high-frequency signal. This makes it possible to mitigate the influence on the sending and receiving of control information (billing information, participation information, etc.).

The program specific information PSI in the service information is transmitted upon being multiplexed with the audio/video information. If this expedient is adopted, the program specific information PSI that has been decided by ordinance is not sent by special transmission but can be transmitted in a form multiplexed with the program information.

Further, several tables constituting service information are selected in such a manner that a transmission rate necessary for transmitting these tables will exceed the difference between the total transmission rate and the prescribed transmission rate, and the selected tables are transmitted to the subscriber device using the second high-frequency signal. If this arrangement is adopted, service information is transmitted by the second high-frequency signal to a degree commensurate with the amount of excess. As a result, the amount of information sent by the second high-frequency signal can be reduced and the influence on the sending and receiving of control information (billing information, participation information, etc.) can be mitigated.

Other features and advantages of the present invention will be apparent from the following description taken in conjunction with the accompanying drawings.

BRIEF DESCRIPTION OF THE DRAWINGS

FIG. 9 is a diagram useful in describing the identifiers of service information SI.

DESCRIPTION OF THE PREFERRED EMBODIMENTS (A) First Embodiment (a) Digital Multiplex Transmission System FIG. 1 is a block diagram showing the configuration of a digital multiplex transmission system according to the present invention. As shown in FIG. 1, the system includes a CATV center 1 serving as a digital multiplex transmission apparatus. The CATV center 1 transmits multiplexed information to a digital broadcast receiving terminal (DSTB), which is installed in one's home, via a network. The multiplexed information is obtained by multiplexing audio/video information of a plurality of programs and service information SI, which includes PSI stipulated by the MPEG-2 standard, in accordance with the MPEG-2 format. The system further includes a bidirectional optical transmission path 2, DSTBs (digital set-top boxes) $3_1$–$3_n$ and TV monitors $4_1$–$4_n$.

Figure 1:
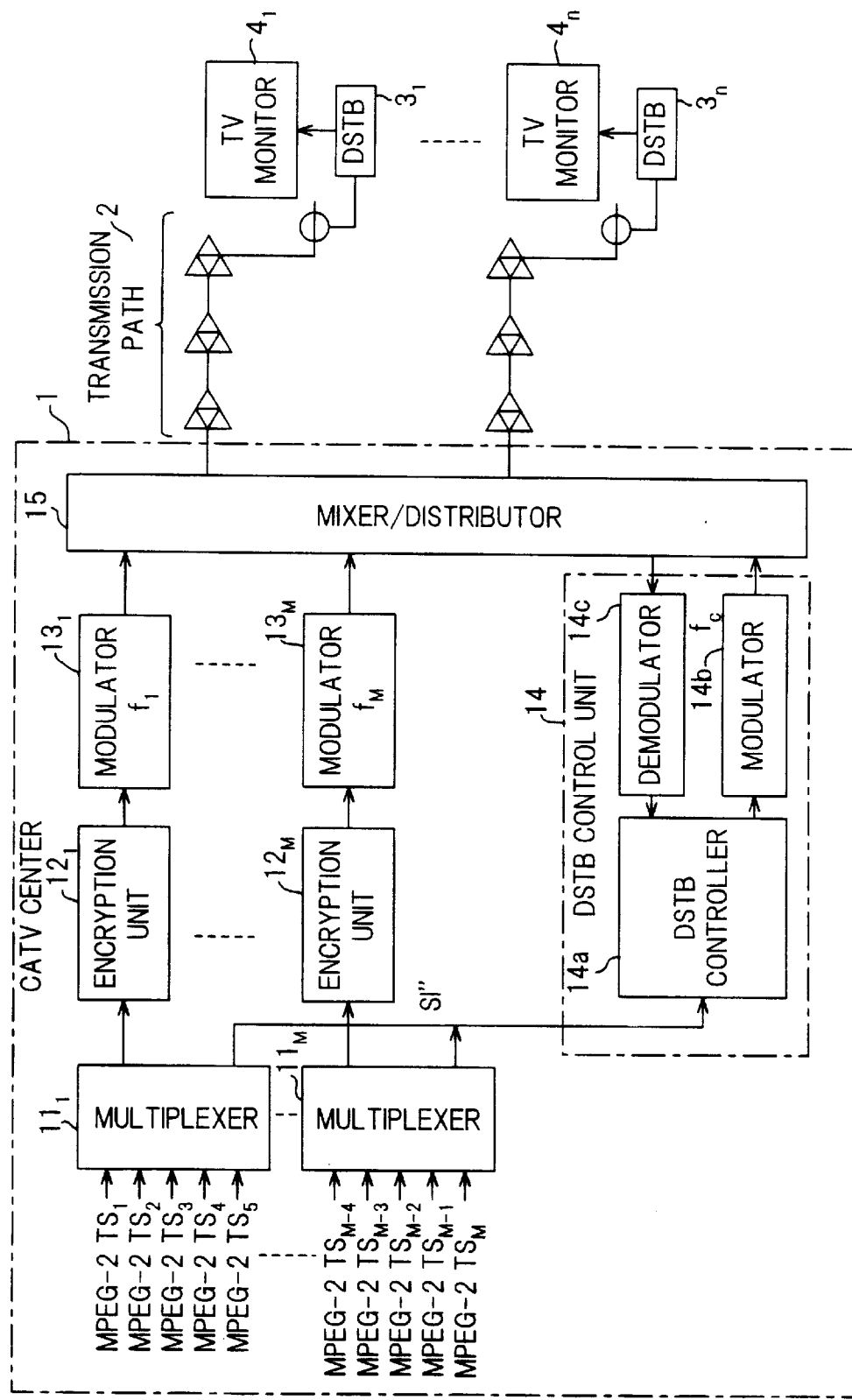
FIG. 1 is a block diagram showing the configuration of a digital CATV system according to a first embodiment of the present invention.

The CATV center 1 includes multiplexers $11_1$–$11_m$ for multiplexing and outputting a number of MPEG-2 transport streams (MPEG-2 $TS_1$–MPEG-2 $TS_5$, . . . , MPEG-2 $TS_{M-4}$–MPEG-2 $TS_M$); encryption units $12_1$–$12_M$ for encrypting the MPEG-2 transport streams (MPEG-2 TS), which are sent from the multiplexers, by scrambling the transport streams; modulators $13_1$–$13_M$ for subjecting carrier signals to 64-QAM by the MPEG-2 transport streams and frequency-converting the modulated signals to high-frequency signals having frequencies $f_1$–$f_M$, respectively; a DSTB control unit 14 for sending and receiving billing information, participation information, DSTB status information and partial service information SI" to and from each DSTB using a high-frequency signal having a frequency $f_c$; and a mixer/distributor 15 for mixing and sending high-frequency signals output by each modulator and by the DSTB control unit 14, and inputting high-frequency signals, which arrive from each of the DSTBs, to the DSTB control unit 14.

The multiplexers $11_1$–$11_M$, which are identically constructed, (1) multiplex audio/video MPEG-2 TS of a program, which is selected from a number of MPEG-2 transport streams (MPEG-2 $TS_1$–MPEG-2 $TS_5$, . . . , MPEG-2 $TS_{M-4}$–MPEG-2 $TS_M$), and service information and send the resulting signals to the encryption units $12_1$–$12_M$; (2) calculate the total value R of the transmission rates of audio/video streams (audio/video MPEG-2 TS) of all programs contained in transmitted MPEG-2 TS; and (3) transmit the partial service information SI" via the DSTB control unit 14 when the total transmission rate R is greater than a predetermined transmission rate $R_S$ decided by the maximum transmission rate of the transmission path.

The DSTB control unit 14 includes a DSTB controller 14a, a modulator 14b for subjecting a carrier signal to QPSK modulation by transmitted data (various commands and the service information SI"), frequency-converting the modulated signal to a high-frequency signal of frequency fc, and sending the resulting signal to the mixer/distributor 15, and a demodulator 14c for demodulating billing information, participation information and DSTB status information from the high-frequency signal that enters from the mixer/distributor 15, and inputting the demodulated signal to the DSTB controller 14a.

(b) Multiplexer

Figure 2:
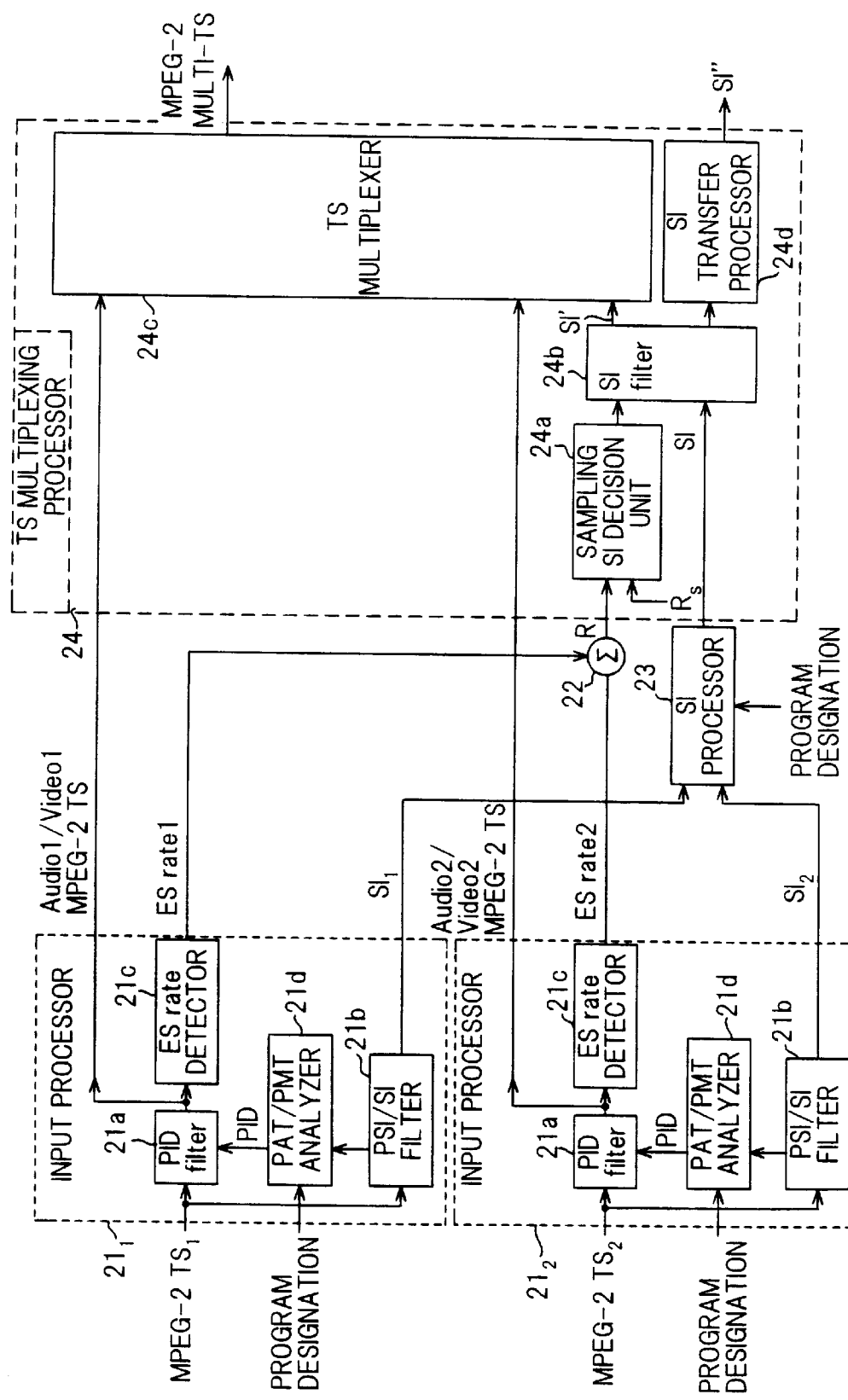
FIG. 2 is a block diagram showing the construction of a multiplexer according to the first embodiment.

FIG. 2 is a block diagram illustrating the construction of the multiplexer. Though this is a case in which there are two MPEG-2 transport streams (MPEG-2 $TS_1$ and MPEG-2 $TS_2$), the number of transport streams is not limited to two. As shown in FIG. 2, the multiplexer includes input processors $21_1$, $21_2$, respectively comprising a PID filter 21a, a PSI/SI filter 21b, an ES rate detector 21c and a PAT/PMT analyzer 21d. The PID filters 21a separate the audio/video streams (audio/video MPEG-2 TS) of designated programs from the MPEG-2 TS (MPEG-2 $TS_1$ and MPEG-2 $TS_2$), and the PSI/SI filters 21b separate service information $SI_1$ and $SI_2$, which includes PSI, from the MPEG-2 TS (MPEG-2 $TS_1$ and MPEG-2 $TS_2$). The ES rate detectors 21c detect the transmission rates of the respective audio/video streams (audio/video MPEG-2 TS). By referring to the PAT (Program Association Table) and PMT (Program Map Table) in the service information, the PAT/PMT analyzers 21d obtain the packet identifiers PID of the audio/video streams (audio/video MPEG-2 TS) of the designated programs and set the PIDs in the PID filters 21a.

Figure 10:
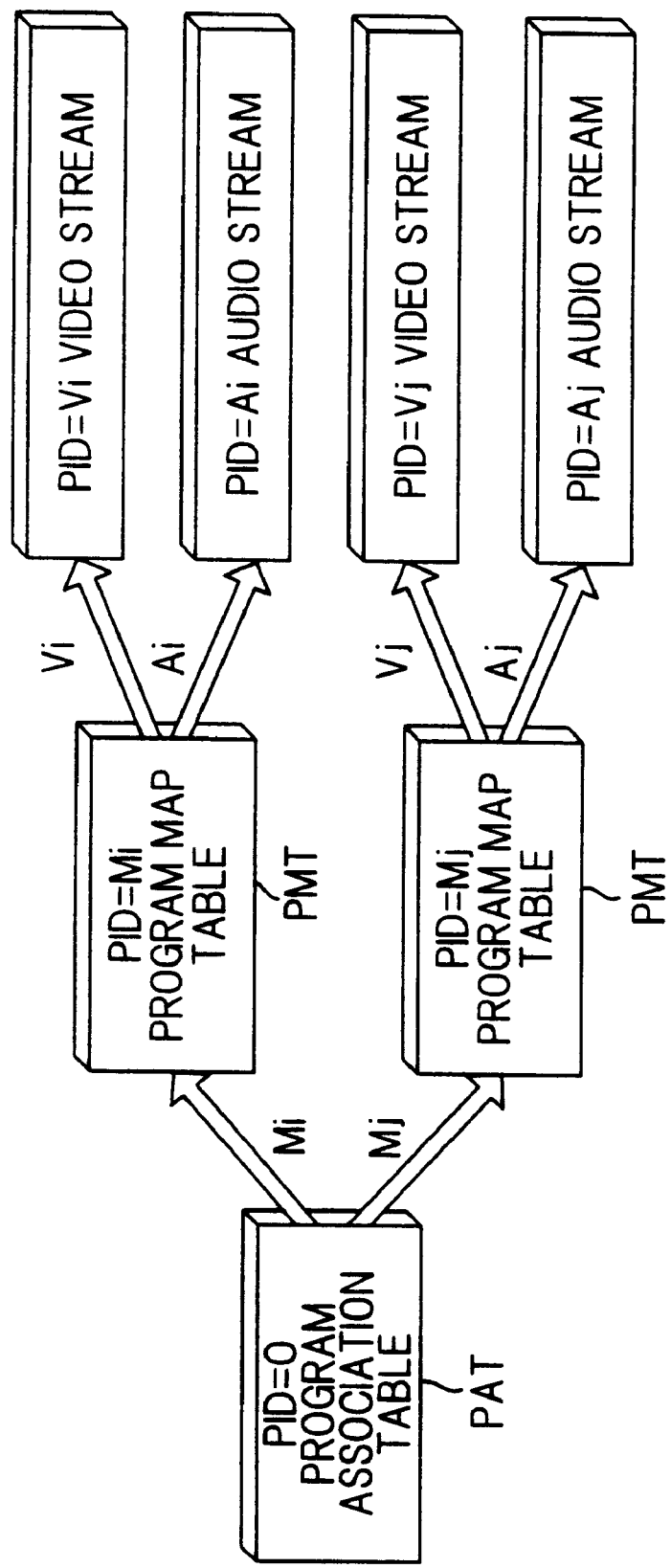
FIG. 10 is a diagram useful in describing the hierarchical structure of MPEG-2 TS PSI.

The packet identifier PID of each table constituting the service information SI is already known, as shown in FIG. 9. Accordingly, by referring to the packet identifiers PID of the respective tables, the PSI/SI filters 21b separate the service information $SI_1$, $SI_2$ from the MPEG-2 (MPEG-2 $TS_1$ and MPEG-2 $TS_2$) and input the PAT and PMT to the PAT/PMT analyzers 21d. As described earlier in connection with FIG. 10, the PAT/PMT analyzers 21d use the PAT and PMT to obtain the PIDs of video streams (video MPEG-2 TS) and audio streams (audio MPEG-2 TS) of all programs included in the MPEG-2 TS (MPEG-2 $TS_1$ and MPEG-2 $TS_2$), and input the PIDs of designated programs to the PID filters 21a. As a result, the PID filters 21a separate the video streams (video MPEG-2 TS) and audio streams (audio MPEG-2 TS) of designated programs from the entered MPEG-2 TS (MPEG-2 $TS_1$ and MPEG-2 $TS_2$) and output the streams. The ES rate detectors 21c use the ES rate information included in the header of a PES packet, described in FIG. 3, to calculate and output the transmission rates of the video streams (video MPEG-2 TS) and audio streams (audio MPEG-2 TS) that enter from the PID filters.

Figure 3:
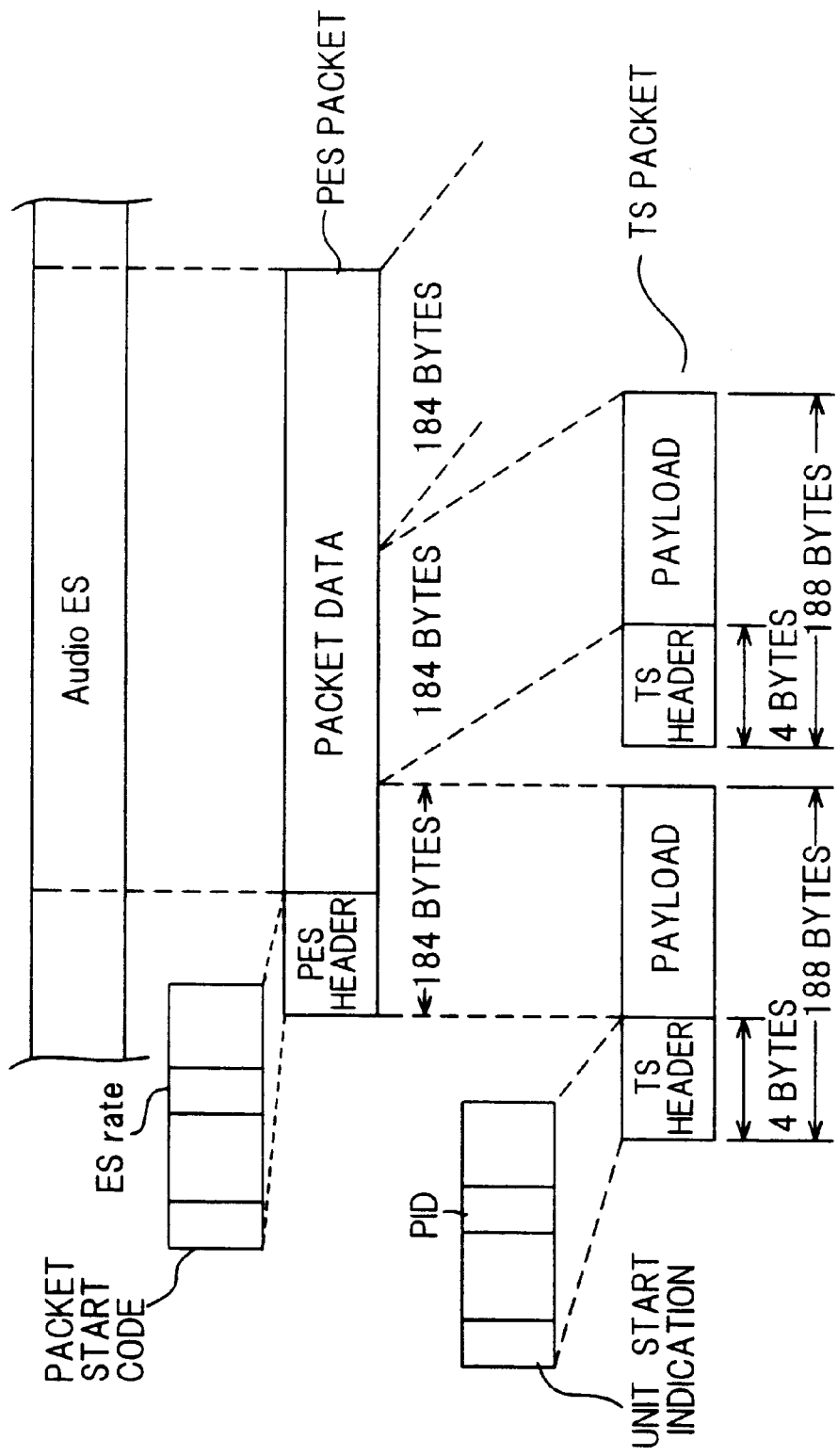
FIG. 3 is a diagram useful in describing the structure of an audio elementary stream (Audio ES)

The video elementary streams (video ES) and audio elementary streams (audio ES) of a plurality of programs and the service information SI are time-division multiplexed onto MPEG-2 (MPEG-2 $TS_1$ and MPEG-2 $TS_2$) using packets. FIG. 3 is a diagram for describing the structure of the audio ES. The video stream is similarly structured. The audio ES is divided into packet data of a prescribed size, and a PES (Packetized Elementary Stream) packet is formed by attaching a PES header to the beginning of each item of packet data. The PES header includes a packet start code and the ES rate, etc. The PES packet is further partitioned every 184 bytes, and a 4-byte TS header is attached to the beginning of each 184-byte subdivision to form a 188-byte TS packet. The TS header contains a unit start indication, which indicates that a PES header is included, and the identifier PID of the audio ES.

Accordingly, when the identifier PID of an audio/video stream (audio/video MPEG-2 TS) of a designated program is set in the PID filter 21a by the PAT/PMT analyzer 21d, the PID filter 21a selects and outputs the TS packet having this identifier. The ES rate detector 21c checks to determine whether the TS header includes the unit start indication. If the unit start indication is included, the ES rate detector 21c obtains the ES rate information from the PES header of the payload and uses the ES rate information to calculate and output the transmission rates of the video stream (video MPEG-2 TS) and audio stream (audio MPEG-2 TS).

An adder 22 calculates the total value R of the transmission rates of the audio/video streams (audio/video MPEG-2 TS) of all designated programs, namely all programs contained in the MPEG-2 TS output by the multiplexers. Using the service information $SI_1$, $SI_2$ output by the PSI/SI filters 21b of the respective input processors $21_1$, $21_2$, an SI processor 23 creates and outputs service information SI of a program contained in the MPEG-2 TS transmitted.

A TS multiplexing processor 24 includes a sampling SI decision unit 24a, an SI filter 24b, a TS multiplexer 24c, which multiplexes and outputs the audio/video streams (audio/video MPEG-2 TS) sent from the input processors $21_1$–$21_2$ and service information SI', and an SI transfer processor 24d. The sampling SI decision unit 24a compares the total transmission rate R of the audio/video streams (audio/video MPEG-2 TS) of all multiplexed and transmitted programs with a set transmission rate $R_S$ and, depending upon the result of the comparison, decides partial service information to be transmitted separately of the audio/video streams (audio/video MPEG-2 TS). It should be noted that the set transmission rate $R_S$ is a value (=Rmax−Rp) obtained by subtracting a transmission rate Rp (bps), which is necessary to transmit all service information SI, from a maximum transmission rate Rmax (bps) allowed for the transmission path, by way of example.

(1) If $R<R_S$ holds, that is, if the maximum transmission rate Rmax of the transmission path is not exceeded even when the audio/video streams (audio/video MPEG-2 TS) of all programs and all service information are multiplexed and transmitted, then the SI filter 24b inputs all of the service information to the TS multiplexer 24c. (2) If $R \geq R_S$ holds, that is, if the maximum transmission rate Rmax of the transmission path is exceeded when the audio/video streams (audio/video MPEG-2 TS) of all programs and all service information are multiplexed and transmitted, then the SI filter 24b inputs some of the service information, e.g., the EIT (Event Information Table), to the SI transfer processor 24d to transmit this information separately of the audio/video streams (this is referred to as "branched transmission"), and inputs all of the remaining service information to the TS multiplexer 24c to multiplex and transmit this information with the audio/video streams.

The reason for branched transmission solely of the EIT is that since the EIT specifies information relating to a program, such as the name of the program, the broadcast date and time and a description of the program content, the EIT contains the largest amount of data. More specifically, if the EIT containing this large quantity of data is sent by branched transmission, there will be a high probability that the maximum transmission rate Rmax of the transmission path will not be exceeded when the audio/video streams of all programs and the remaining service information are multiplexed. In a modification of this embodiment, it is possible to adopt an arrangement in which all service information SI with the exception of PSI is branched when $R \geq R_S$ holds. Further, it is possible to adopt an arrangement in which, when $R \geq R_S$ holds, a branched table is selected in such a manner that the overall transmission rate of several tables subjected to branched transmission by the sampling SI decision unit 24a will be greater than $(R-R_S)$, this table is input to the SI transfer processor 24d and the remaining information is input to the TS multiplexer 24c.

The TS multiplexer 24c multiplexes the audio/video streams (audio/video MPEG-2 TS) sent from the input processors $21_1$–$21_2$ and the service information SI' output by the SI filter 24b and outputs the multiplexed signal to the encryption unit as MPEG-2 multi-TS. The SI transfer processor 24d enters the input service information SI" to the DSTB control unit 14 (FIG. 1). Upon receiving the service information SI", the DSTB control unit 14 subjects the carrier signal to QPSK modulation by the service information SI", frequency-converts the modulated signal a high-frequency signal of frequency fc and sends the resulting signal.

Thus, if the total transmission rate R of all programs multiplexed and transmitted from the multiplexers $11_1$–$11_M$ is less than the set transmission rate $R_S$, the service information does not undergo branched transmission but is multiplexed with the audio/video streams and sent to the DSTBs $3_1$–$3_n$ of the subscribers via the optical transmission path 2. If the total transmission rate R of all programs multiplexed and transmitted from the multiplexers $11_1$–$11_M$ is greater than the set transmission rate $R_S$, on the other hand, the partial service information SI" is sent from the DSTB control unit 14 to the DSTBs $3_1$–$3_n$ of the subscribers via the optical transmission path 2 and the remaining service information SI', which includes the PSI, is multiplexed with the audio/video streams and sent to the DSTBs $3_1$–$3_n$.

(c) DSTB Control Unit

Figure 4:
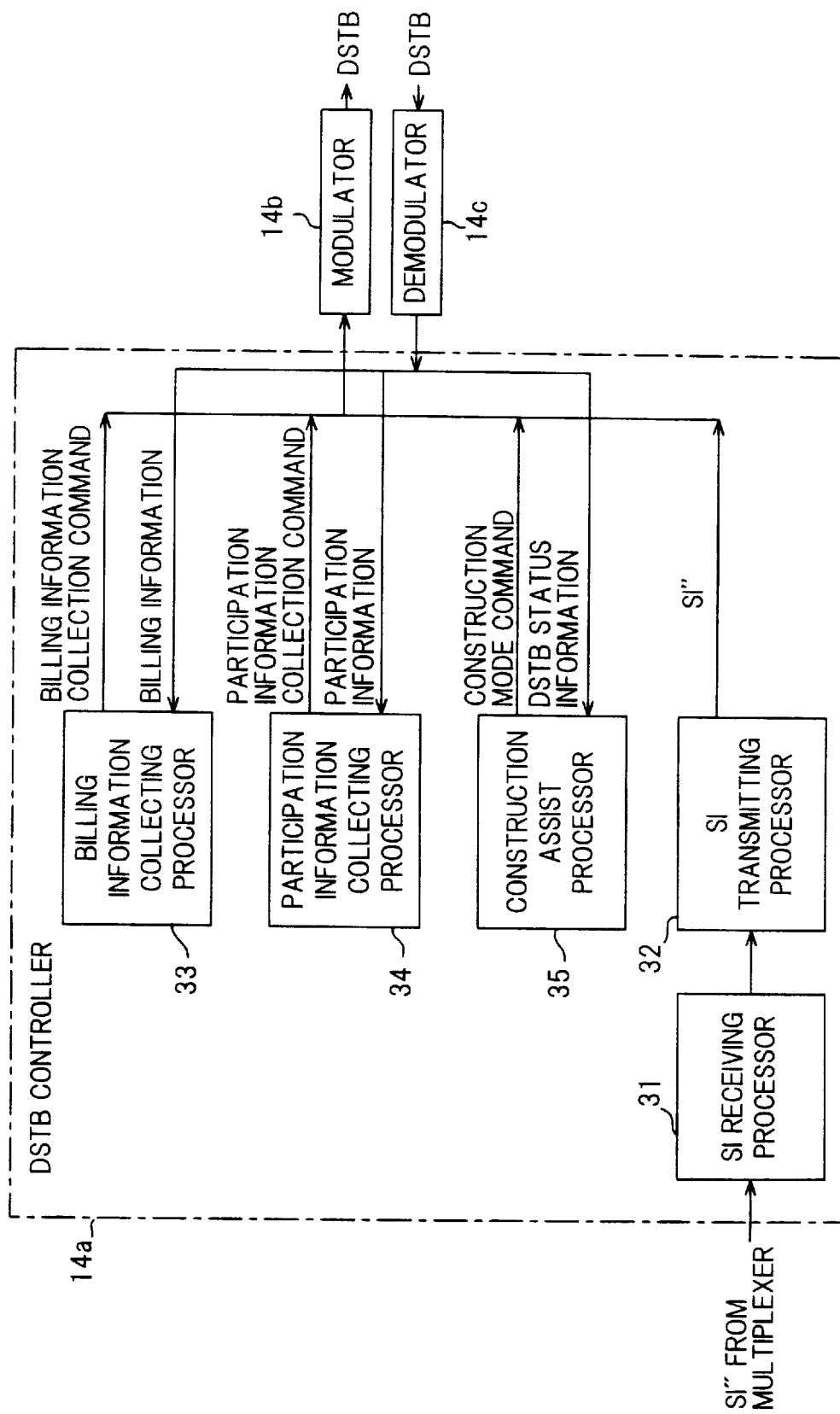
FIG. 4 is a block diagram showing the construction of a DSTB control unit.

FIG. 4 is a block diagram of the DSTB control unit. The DSTB control unit includes the DSTB controller 14a, the modulator 14b for subjecting the carrier signal to QPSK modulation by transmitted data (a billing information collection command, a participation information collection command, a construction mode command and the service information SI"), frequency-converting the modulated signal to a high-frequency signal of frequency $f_c$, and sending the resulting signal to the next stage, and the demodulator 14c for demodulating billing information, participation information and DSTB status information from the high-frequency signal that enters from the mixer/distributor 15, and inputting the demodulated signal to the DSTB controller 14a. The DSTB controller 14a includes an SI receiving processor 31 for receiving the service information SI" that enters from the processors $11_1$–$11_M$, an SI transmitting processor 32 for operating upon the received service information SI" and transmitting the information to the DSTB, a billing information collecting processor 33 for collecting billing information from the DSTBs, a participation information processor 34 for collecting participation information from the DSTBs, and a construction assist processor 35 which performs control for verifying operation when a DSTB is installed.

(d) DSTB

Figure 5:
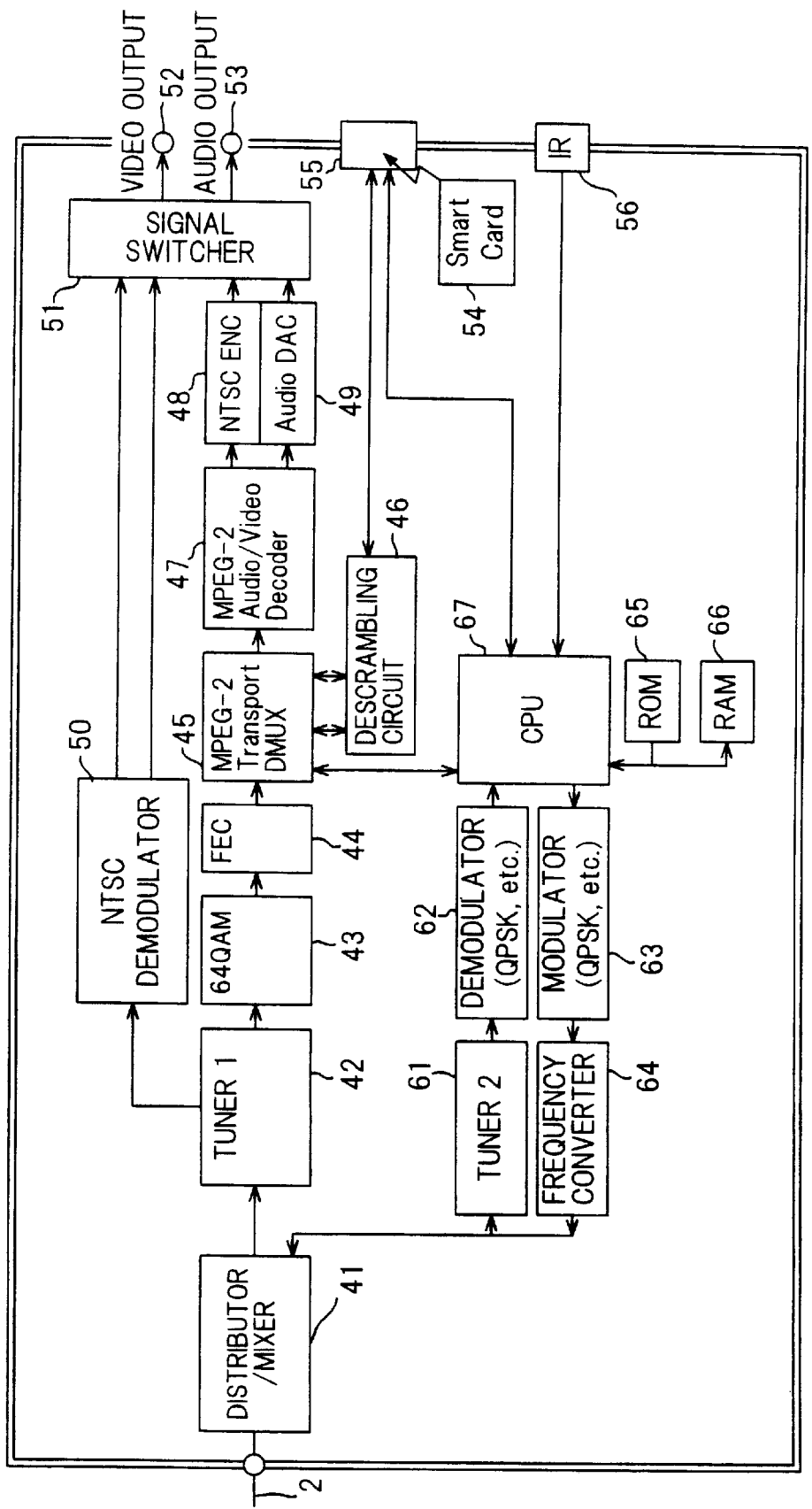
FIG. 5 is a block diagram of a DSTB.

FIG. 5 is a block diagram of a DSTB. As shown in FIG. 5, the DSTB includes a distributing/mixing circuit 41 for distributing a high-frequency signal that enters from the optical transmission path 2 to first and second tuners 42, 61, and sending a high-frequency signal that enters from the second tuner 61 to the optical transmission path 2. The first tuner 42, which is for receiving audio/video/service information, receives a predetermined high-frequency signal and converts the signal to a baseband signal. A demodulator 43 subjects the modulated signal of the baseband to 64-QAM. A forward error correction circuit (FEC) 44 corrects transmission path error. A demultiplexer 45 separates the audio/video stream (audio/video MPEG-2 TS) of a program designated by a CPU from the input MPEG-2 TS and a descrambling circuit 46 performs descrambling. An audio/video decoder 47 restores an audio/video signal, which has been compressed in accordance with the MPEG-2 scheme, to PCM audio data and video data. The DSTB further includes an NTSC encoder 48, an audio DA-converter 49 for digital-to-analog converting, an NTSC decoding circuit 50, a signal switching circuit 51, a video output terminal 52 to which a TV monitor is connected, an audio output terminal to which an audio device is connected, a smart card 54 equipped with an IC memory to which billing information, participation information and agreement information is written, a smart-card accommodating terminal 55 and a remote control terminal 56.

The second tuner 61, which is for receiving various commands and service information SI" sent from the DSTB control unit, receives the high-frequency signal $f_c$ and converts this signal to a baseband signal. A demodulator 62 subjects the modulated signal of the baseband to QPSK demodulation. A QPSK quadrature modulator 63 subjects a carrier wave to quadrature modulation by billing information, participation information and DSTB status information, and a frequency converter 64 up-converts the modulated signal to the high-frequency signal $f_c$. The apparatus further includes a ROM 65, a RAM 66 and a CPU 67 for controlling the overall DSTB. By way of example, the CPU 67 controls the demultiplexer 45 based upon program selection data that has entered from a remote controller, thereby causing the demultiplexer 45 to separate and output the audio/video signal of a program, which has been selected by a user, from the MPEG-2 TS. Further, the CPU 67 creates billing information, participation information and construction status information and stores the information in the smart card 54. When a billing-information collection command, participation-information collection command or construction mode command is received from the DSTB control unit, the CPU 67 reads the information out of the smart card 54 and communicates it to the DSTB control unit. Further, the CPU executes descrambling processing, and processing for restoring the service information SI".

Figure 6:
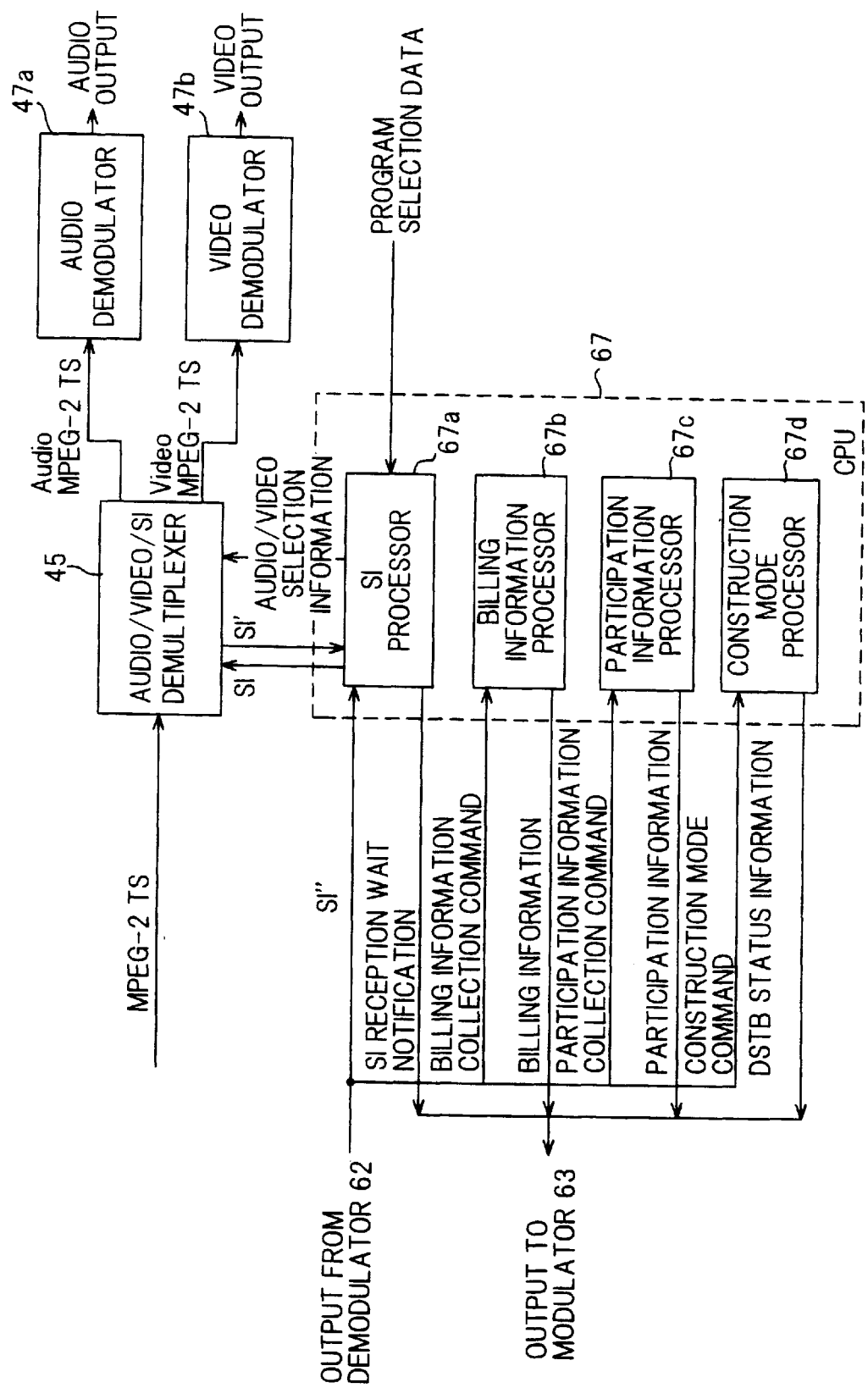
FIG. 6 is a diagram useful in describing the processing performed by a CPU in the DSTB.

FIG. 6 is a block diagram of the CPU and associated components.

The demultiplexer 45 receives the MPEG-2 TS sent from the multiplexer and demultiplexes the signal to obtain MPEG-2 TS in which audio is the payload, MPEG-2 TS in which video is the payload and service information SI. An audio decoder 47a extracts an audio elementary stream (audio ES) from the audio MPEG-2 TS and decodes the PCM audio signal. A video decoder 47b extracts a video elementary stream (video ES) from the video MPEG-2 TS and decodes the video signal.

The CPU 67 includes an SI processor 67a, a billing information processor 67b, a participation information processor 67c and a construction mode processor 67d. The SI processor 67a combines the partial service information SI" sent from the DSTB control unit 14 and the service information SI' that enters from the audio/video/SI demultiplexer 45, thereby creating the original service information SI, transmits the service information SI to the demultiplexer 45 and, based upon the service information SI, displays receivable service information on a display unit, which is not shown.

The billing information processor 67b processes the billing information collection command from the DSTB control unit 14 and sends the billing information within the DSTB back to the DSTB control unit 14. The participation information processor 67c processes the participation information collection command from the DSTB control unit 14 and sends the participation information within the DSTB back to the DSTB control unit 14. The construction mode processor 67d processes the construction mode command from the DSTB control unit 14 and starts/stops an operation verification function when the DSTB is installed.

(e) Overall Operation

The multiplexers $11_1$–$11_M$, DSTB control unit 14 and DSTBs $3_1$–$3_n$ operate in the manner described below. As the result of this operation, the sum total of the bit rates of MPEG-2 TS sent from the multiplexers $11_1$–$11_M$ do not exceed the data transmission rate allowed for the transmission path, and each DSTB is capable of decoding audio/video correctly.

(e-1) Multiplexer Processing Procedure

The PID filter 21a checks to determine whether the PID described in the TS header of input MPEG-2 TS is the PID of a designated program, extracts the audio/video stream (audio/video MPEG-2 TS) of the designated program and sends the audio/video stream to the TS multiplexing processor 24 and ES rate detector 21c.

Next, the ES rate detector 21c extracts the MPEG-2 packet that includes the PES packet header in the entered audio/video MPEG-2 Ts, extracts the bit rate of the elementary data stream described in the PES packet header and sends the bit rate to the adder 22. The adder 22 calculates the total value R of the bit rates of the audio/video MPEG-2 TS that enter from the ES rate detectors 21c of the input processors $21_1$, $21_2$.

Using the service information $SI_1$, $SI_2$ output by the PSI/SI filters 21b, the SI processor 23 creates the service information SI of a program actually multiplexed and output.

The sampling SI decision unit 24a compares the total transmission rate R of the audio/video streams (audio/video MPEG-2 TS) of all programs multiplexed and transmitted with the set transmission rate $R_S$ and inputs the result of the comparison to the SI filter 24b.

(1) If $R<R_S$ holds, that is, if the maximum transmission rate Rmax of the transmission path is not exceeded even when the audio/video streams (audio/video MPEG-2 TS) of all programs and all service information are multiplexed and transmitted, then the SI filter 24b inputs all of the service information to the TS multiplexer 24c. (2) If $R \geq R_S$ holds, that is, if the maximum transmission rate Rmax of the transmission path is exceeded when the audio/video streams (audio/video MPEG-2 TS) of all programs and all service information are multiplexed and transmitted, then the SI filter 24b inputs some of the service information, e.g., the EIT (Event Information Table), to the SI transfer processor 24d to transmit this information separately of the audio/video streams (this is referred to as "branched transmission"), and inputs all of the remaining information to the TS multiplexer 24c to multiplex and transmit this information with the audio/video streams.

On the basis of the MPEG-2 standard, the TS multiplexer 24c multiplexes the service information SI' sent from the SI filter 24b and the audio/video MPEG-2 TS entering from the input processors $21_1$–$21_2$ and sends new MPEG-2 TS (MPEG-2 multi-TS) to the DSTBs $3_1$–$3_n$ via the transmission path.

In accordance with the protocol being used between the multiplexers $11_1$–$11_M$ and the DSTB control unit 14, the SI transfer processor 24d packetizes the service information SI" having the number of the multiplexer appended thereto and sends the packetized information to the DSTB control unit 14. Since there are cases where service information is output by a plurality of multiplexers $11_1$–$11_M$, thus resulting in collision, control for avoiding packet collision is carried out.

By executing the above-described processing, it is possible to multiplex audio/video of a designated program and service information in such a manner that the maximum transmission rate of the transmission path is not exceeded.

It should be noted that if $R \geq R_S$ holds, the EIT (Event Information Table) is sent by branched transmission. However, it is also possible to decide the table that is to be sent by branched transmission. Specifically, in such an arrangement, the sampling SI decision unit 24a obtains the difference between the total transmission rate R and the set transmission rate $R_S$ that conforms to the maximum transmission rate of the transmission path. If the difference value is positive (i.e., if $R>R_S$) holds, the sampling SI decision unit 24a selects the table of the service information having a bit rate equal to or greater than this value and sends the identifier PID of this table to the SI filter 24b. However, the PSI cannot be among the tables selected. The SI filter 24b inputs the table (the partial service information SI") having the identifier PID specified by the sampling SI decision unit 24a to the SI transfer processor 24d in order to perform branched transmission, and inputs tables (the service information SI' ) having other identifiers to the TS multiplexer 24c.

(e-2) Processing Procedure for DSTB Control

A method of sending the separated service information SI" to each DSTB will be described next. The processing for sending the separated service information SI" to each DSTB is carried out by the DSTB control unit 14. The procedure of this processing is set forth below.

The service information SI" that has been sent from the multiplexers $11_1$–$11_M$ is received by the SI receiving processor 31 (FIG. 4) and then sent to the SI transmitting processor 32.

The SI transmitting processor 32 executes transmission pre-processing such as data format conversion in order to send the service information SI" to a DSTB. After the completion of transmission pre-processing, the SI transmitting processor 32 notifies the DSTB of SI transmission. If the DSTB responds to this notification of SI transmission by sending notification of SI reception back to the SI transmitting processor 32, then the SI transmitting processor 32 sends the service information SI" to the DSTB. It should be noted that how often the service information SI" is sent from the DSTB control unit 14 conforms to ARIB/CATV standards.

By executing the processing set forth above, the partial service information SI" can be sent from the multiplexers $11_1$–$11_M$ to each DSTB via the DSTB control unit 14.

(e-3) DSTB Processing Procedure

Finally, processing of service information and decoding of MPEG-2 TS in a DSTB will be described.

The audio/video/SI demultiplexer 45 (FIG. 6) extracts the service information SI' from the MPEG-2 TS sent from the multiplexers $11_1$–$11_M$ and inputs the service information SI' to the SI processor 67a of the CPU 67.

If the SI processor 67a receives the SI transmission notification from the DSTB control unit 14 in concurrence with the foregoing, the SI processor 67a sends back notification of the fact that SI reception is being awaited. After this notification is sent, the SI processor 67a receives the service information SI" sent from the DSTB control unit 14, combines this information with the service information SI' already obtained, thereby generating the original service information SI, inputs this service information SI to the demultiplexer 45, uses this service information SI to generate service information that is for selecting audio/video MPEG-2 TS of the desired program, and displays this information of a display unit.

If the user selects a program using the remote controller under these conditions, the program selection data enters the SI processor 67a. On the basis of this program selection data, the SI processor 67a generates audio/video selection information (the PID of the audio/video MPEG-2 TS of the selected program) and sends the PID to the audio/video/SI demultiplexer 45.

The demultiplexer 45 analyzes the audio/video selection information, separates the audio/video signals (audio/video MPEG-2 TS) specified by this information and sends the signals to the audio decoder 47a and video decoder 47b.

The audio decoder 47a and video decoder 47b decode the audio/video MPEG-2 TS to the PCM audio signal and video signal and output the decoded signals.

By executing the above-described processing, the items of service information SI' and SI", even though they are sent separately, can be combined to generate the original service information SI. This makes it possible to correctly decode and reproduce the audio/video of a program selected by the user.

(B) Second Embodiment

Figure 7:
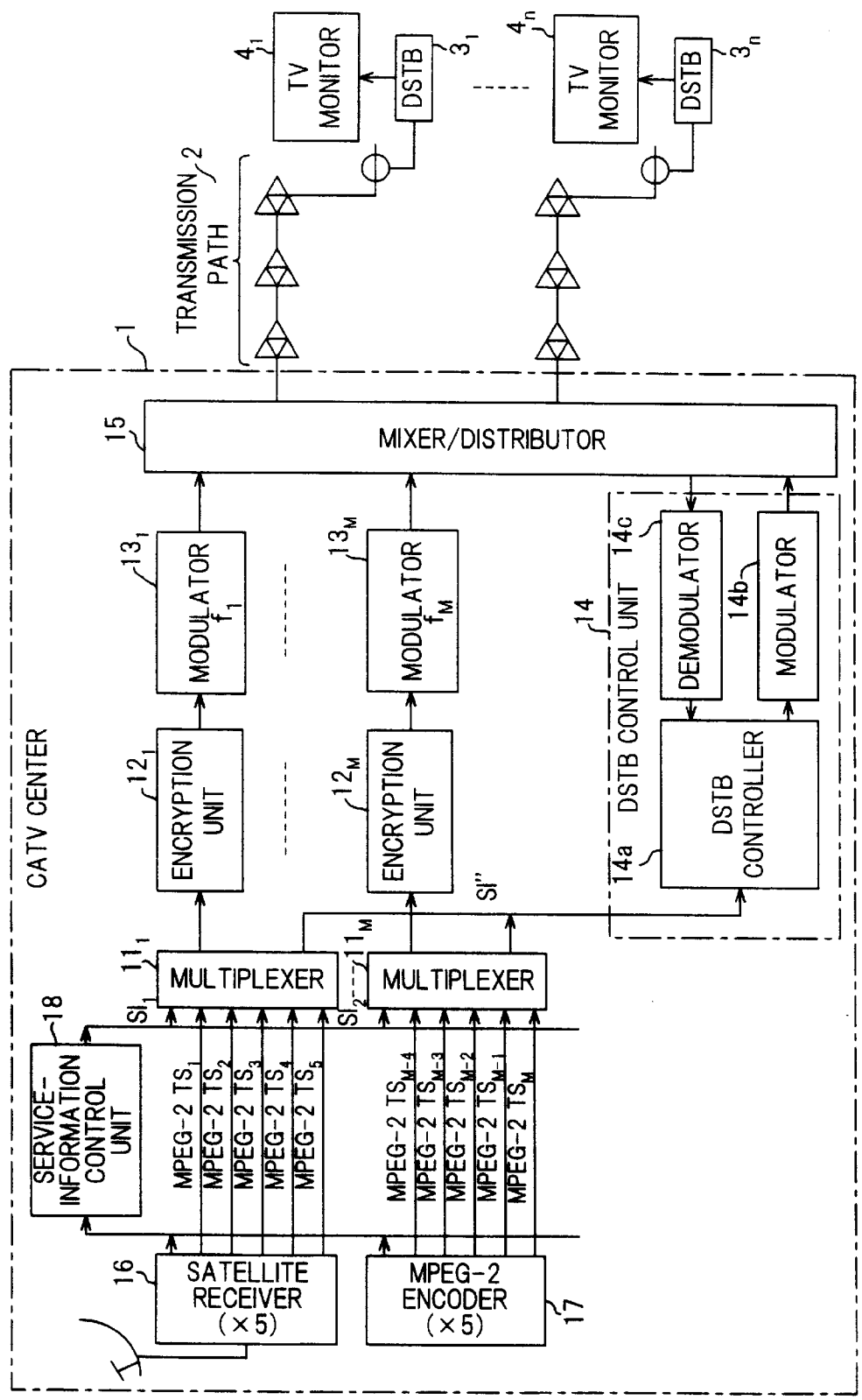
FIG. 7 is a block diagram showing the construction of a digital CATV system according to a second embodiment of the present invention.

In the first embodiment, the case described is one in which the MPEG-2 transport streams (MPEG-2 $TS_1$–MPEG-2 $TS_5$, . . . , MPEG-2 $TS_{M-4}$–MPEG-2 $TS_M$) input to the multiplexers $11_1$–$11_M$ contain service information. However, there is also a case in which transport streams do not include service information. FIG. 7 is a block diagram showing the construction of a CATV center (digital multiplex transmission system) in such a case. Components in FIG. 7 identical with those of the CATV center of the first embodiment shown in FIG. 1 are designated by like reference characters. As shown in FIG. 7, the CATV center 1 includes a satellite receiver 16, five of which, for example, are provided for respectively outputting audio/video MPEG-2 TS (MPEG-2 $TS_1$–MPEG-2 $TS_5$) of a plurality of programs and service information, an MPEG-2 encoder 17, five of which, for example, are provided for respectively outputting audio/video MPEG-2 TS (MPEG-2 $TS_{M-4}$–MPEG-2 $TS_M$) of a plurality of programs and service information, and a service-information control unit 18 for creating and outputting service information $SI_1$, $SI_2$, . . . of each of the MPEG-2 transport streams (MPEG-2 $TS_1$–MPEG-2 $TS_5$, . . . MPEG-2 $TS_1$–MPEG-2 $TS_5$).

The multiplexer $11_1$ selects a desired program from the five audio/video MPEG-2 transport streams (MPEG-2 $TS_1$–MPEG-2 $TS_5$) that enter from the satellite receiver 16, creates the service information of the selected program, multiplexes the audio/video MPEG-2 TS of the selected program and the service information and sends the multiplexed information. Similarly, the multiplexer $11_M$ selects a desired program from the five audio/video MPEG-2 transport streams (MPEG-2 $TS_{M-4}$–MPEG-2 $TS_M$) that enter from the encoder 17, creates the service information of the selected program, multiplexes the audio/video MPEG-2 TS of the selected program and the service information and sends the multiplexed information.

Figure 8:
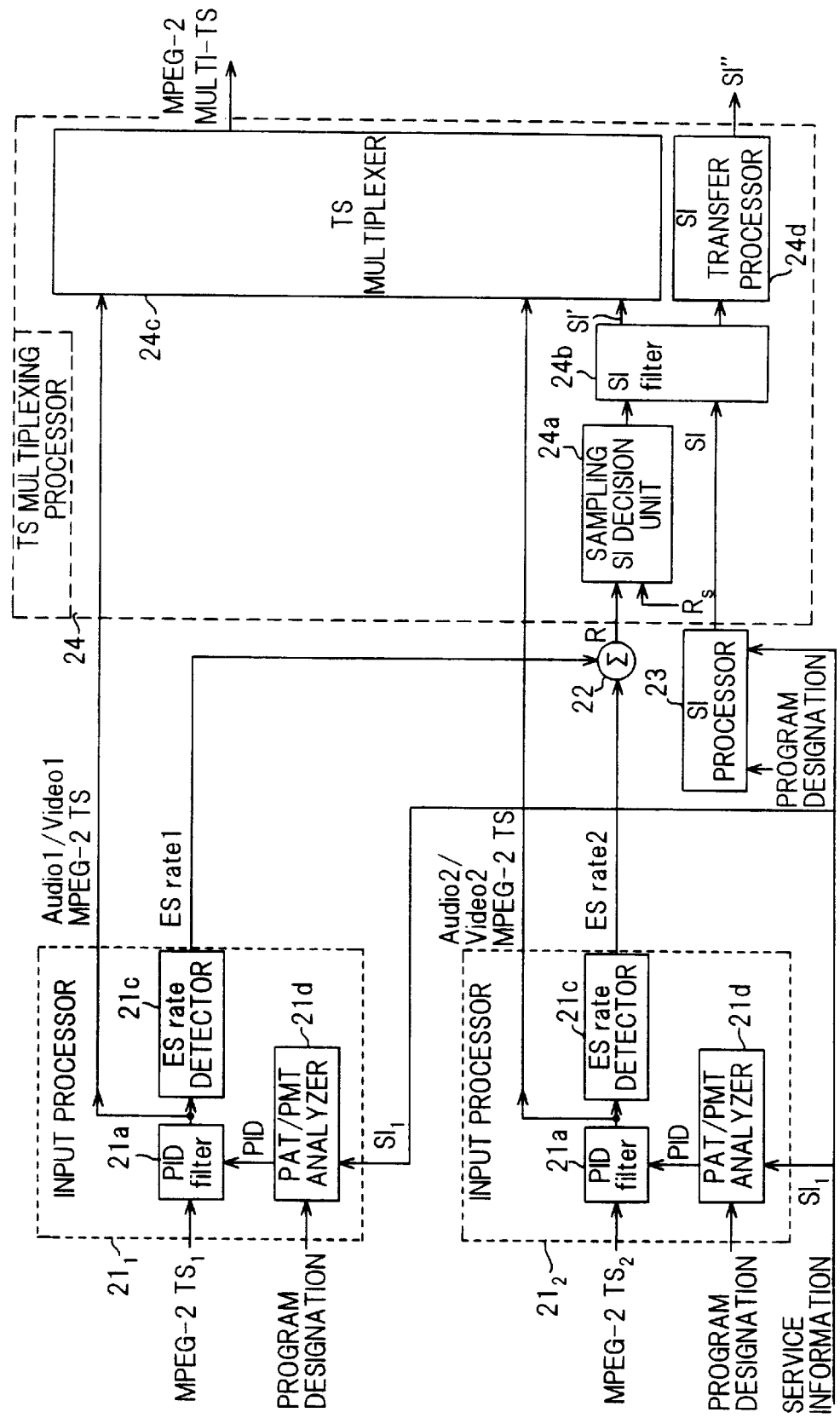
FIG. 8 is a block diagram showing the construction of a multiplexer according to the first embodiment.

FIG. 8 is a block diagram illustrating the construction of the multiplexer $11_1$ according to the second embodiment. Components in FIG. 8 identical with those of the first embodiment of FIG. 2 are designated by like reference characters. This multiplexer differs from that shown in FIG. 2 in that the PSI/SI filters 21b are deleted from the input processors $21_1$–$21_2$ and in that the service information $SI_1$ output by the service-information control unit 18 (FIG. 7) enters the PAT/PMT analyzers 21d and SI processor 23 directly.

Each PAT/PMT analyzer 21d refers to the PAT (Program Association Table) and PMT (Program Map Table) in the service information $SI_1$, which is output by the service-information control unit 18, to obtain the packet identifier PID of the audio/video stream of the specified program and sets the PID in the PID filter 21a. The SI processor 23 uses the service information $SI_1$, which is output by the service-information control unit 18, to create new service information SI selected by the input processors $21_1$, $21_2$, and outputs the service information SI. The operation of other components is exactly the same as in the first embodiment.

Thus, in accordance with this arrangement, service information is transmitted to a subscriber device via a transmission path using a different high-frequency signal if the total value of the transmission rates of multiplexed information obtained by multiplexing audio/video information of each program and service information SI exceeds the maximum transmission rate allowed for the transmission path. (Such transmission is referred to as "branched transmission".) As a result, the total value of the transmission rates of the multiplexed information is reduced by an amount equivalent to the service information sent by branched transmission, whereby the total value falls below the maximum transmission rate allowed for the transmission path. This makes it possible to obtain normal audio and video at the subscriber device (DSTB).

Further, in accordance with the present invention, the digital multiplex transmission apparatus further includes a subscriber control unit for sending and receiving control information (billing information, participation information, etc.) to and from the subscriber device using a second high-frequency signal different from a first high-frequency signal that transmits the multiplexed information obtained by multiplexing the video and audio information. The subscriber control unit, therefore, is used as device for branched transmission of service information. If this arrangement is adopted, the digital multiplex transmission apparatus and DSTB need not be provided with hardware for sending and receiving new high-frequency signals.

Further, in accordance with the present invention, since the event information table EIT has the highest transmission rate of the tables in the service information, only this table is transmitted to the subscriber device using the second high-frequency signal. If this expedient is adopted, it will be unnecessary to transmit all of the service information using the second high-frequency signal; it will suffice to send only some of the service information using this signal. This makes it possible to mitigate the influence on the sending and receiving of control information (billing information, participation information, etc.).

Further, in accordance with the present invention, the program specific information PSI in the service information is transmitted upon being multiplexed with the audio/video information. If this expedient is adopted, the program specific information PSI that has been decided by ordinance is not sent by special transmission but can be transmitted in a form multiplexed with the program information.

Further, in accordance with the present invention, a table is selected in such a manner that a transmission rate necessary for transmitting several tables constituting service information will exceed the difference between a total transmission rate R and a prescribed transmission rate $R_S$, and the selected table is transmitted to the subscriber device using the second high-frequency signal. If this arrangement is adopted, service information is transmitted by the second high-frequency signal to a degree commensurate with the amount of excess. As a result, the amount of information sent by the second high-frequency signal can be reduced and the influence on the sending and receiving of control information (billing information, participation information, etc.) can be mitigated.

As many apparently widely different embodiments of the present invention can be made without departing from the spirit and scope thereof, it is to be understood that the invention is not limited to the specific embodiments thereof except as defined in the appended claims.

What is claimed is:

1. A digital multiplex transmission apparatus in a digital multiplex transmission system for generating multiplexed information by multiplexing audio and video information of a plurality of programs and service information, modulating a carrier signal by the multiplexed information, frequency-converting a signal obtained by this modulation to a first high-frequency and transmitting the first high-frequency signal to a subscriber device via a transmission path, comprising:

a transmission rate detector for detecting transmission rates of video information and audio information of programs;

a total transmission rate calculation unit for calculating a total transmission rate of multiplexed video information and audio information of each program;

a comparator for comparing a prescribed transmission rate, which is decided by a maximum transmission rate allowed for the transmission path, with the total transmission rate; and a service information transmission unit which, when the total transmission rate is greater than the prescribed transmission rate, is for transmitting the service information to the subscriber device via the transmission path using a second high-frequency signal that is different from the first high-frequency signal.

2. The apparatus according to claim 1, wherein an event information table in the service information is transmitted to the subscriber device using the second high-frequency signal.

3. The apparatus according to claim 1, wherein program specific information in the service information is transmitted upon being multiplexed with the audio and video information.

4. The apparatus according to claim 3, further comprising selecting means for selecting several tables constituting service information so that a transmission rate necessary for transmitting these tables will exceed the difference between the total transmission rate and the prescribed transmission rate;

wherein said service information transmission unit transmits the tables selected by said selecting means to the subscriber device using the second high-frequency signal.

5. The apparatus according to claim 1, wherein said service information transmission unit is a subscriber control unit for sending and receiving control information to and from the subscriber device using the second high-frequency signal, and said subscriber control unit transmits the service information to the subscriber device via the transmission path using the second high-frequency signal.

6. A digital multiplex transmission system having a digital multiplex transmission apparatus for modulating a carrier signal by multiplexed information obtained by multiplexing audio and video information of a plurality of programs and service information, frequency-converting the modulated carrier signal to a first high-frequency signal and transmitting the first high-frequency signal to a subscriber device via a transmission path, wherein said digital multiplex transmission apparatus includes: a transmission rate detector for detecting transmission rates of video information and audio information of programs; a total transmission rate calculation unit for calculating a total transmission rate of multiplexed video information and audio information of each program; a comparator for comparing a prescribed transmission rate, which is decided by a maximum transmission rate allowed for the transmission path, with the total transmission rate; and a service information transmission unit which, when the total transmission rate is greater than the prescribed transmission rate, is for transmitting the service information to the subscriber device via the transmission path using a second high-frequency signal that is different from the first high-frequency signal; and said subscriber device has service information restoration means for restoring service information sent using the second high-frequency signal.

7. The system according to claim 6, wherein in a case where said digital multiplex transmission apparatus transmits partial service information upon multiplexing the information with audio and video information and transmits remaining service information using the second high-frequency signal, said subscriber device has means for restoring the partial service information and means for restoring the whole of the service information using the service information transmitted using the second high-frequency signal and the partial service information.

* * * * *